United States Patent
Li et al.

(10) Patent No.: US 11,095,767 B2
(45) Date of Patent: Aug. 17, 2021

(54) SCREEN DISPLAY METHOD AND DEVICE, MOBILE TERMINAL AND STORAGE MEDIUM

(71) Applicant: BEIJING XIAOMI MOBILE SOFTWARE CO., LTD., Beijing (CN)

(72) Inventors: Jiayan Li, Beijing (CN); Fan Jin, Beijing (CN); Jiayi Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/742,821

(22) Filed: Jan. 14, 2020

(65) Prior Publication Data

US 2021/0029240 A1 Jan. 28, 2021

(30) Foreign Application Priority Data

Jul. 24, 2019 (CN) .......................... 201910672203.8

(51) Int. Cl.
*H04M 1/72448* (2021.01)

(52) U.S. Cl.
CPC .............................. *H04M 1/72448* (2021.01)

(58) Field of Classification Search
CPC ......... H04M 1/72563; H04M 1/72519; H04M 2250/16; H04M 1/72448; H04M 1/724; H04M 1/0214; H04M 2250/22; H04M 1/72469; H04M 1/0268; H04M 1/575; G06F 3/0488; G06F 3/0482; G06F 3/04883; G06F 3/04886; G06F 3/04847; G06F 3/04842; G06F 1/1647; G06F 3/038; G06F 3/1423; G06F 3/147; G06F 40/166; G06F 1/1626; G06F 3/041; G06F 1/1641; G06F 1/1652; G06F 3/0416; G06F 1/1616; G06F 1/1643; G06F 1/1637; G06F 1/3265;
(Continued)

(56) References Cited

U.S. PATENT DOCUMENTS

| 8,539,376 B2 * | 9/2013 | Utsuki | .................. | G06F 3/0482 |
| | | | | 715/835 |
| 8,850,365 B2 * | 9/2014 | Cumming | .............. | G06Q 30/02 |
| | | | | 715/864 |
| 9,628,606 B2 * | 4/2017 | Oh | .......................... | H04M 1/04 |

(Continued)

FOREIGN PATENT DOCUMENTS

| CN | 109005289 A | 12/2018 |
| CN | 109086017 A | 12/2018 |

(Continued)

OTHER PUBLICATIONS

First office action of Chinese application No. 201910672203.8 dated Jun. 29, 2020.

(Continued)

*Primary Examiner* — Lana N Le
(74) *Attorney, Agent, or Firm* — Syncoda LLC; Feng Ma

(57) ABSTRACT

A screen display method includes: acquiring screen status when a specified operation is received, the screen status being status of the first display screen and/or status of the second display screen; selecting a display screen from a first display screen and a second display screen according to the screen status and the specified operation; and displaying a first current interface on the selected display screen.

15 Claims, 5 Drawing Sheets

(58) Field of Classification Search
CPC ....... G06F 3/1446; H04W 88/02; H04W 4/14; H04W 68/00
See application file for complete search history.

(56) References Cited

U.S. PATENT DOCUMENTS

| | | | | |
|---|---|---|---|---|
| 2012/0127061 A1* | 5/2012 | Pegg | .................... | G06F 1/1616 345/1.1 |
| 2013/0222208 A1* | 8/2013 | Gorilovsky | ........... | G06F 1/1626 345/1.1 |
| 2013/0249873 A1* | 9/2013 | Zhang | .................. | G06F 1/1618 345/204 |
| 2013/0321340 A1* | 12/2013 | Seo | ....................... | G06F 1/1652 345/174 |
| 2014/0118272 A1* | 5/2014 | Gunn | .................... | G06F 1/3293 345/173 |
| 2015/0056974 A1* | 2/2015 | Kim | ....................... | G06F 9/451 455/418 |
| 2015/0207920 A1* | 7/2015 | Choi | ..................... | G06F 3/0484 455/566 |
| 2015/0220119 A1* | 8/2015 | Seo | ......................... | G09F 9/301 345/173 |
| 2015/0355797 A1* | 12/2015 | Shinkai | ................. | G06F 1/1626 345/173 |
| 2018/0129268 A1* | 5/2018 | Lee | ..................... | G06F 3/04886 |
| 2019/0138200 A1* | 5/2019 | Zhang | ................ | H03K 17/9618 |
| 2019/0281154 A1* | 9/2019 | Choi | ................. | H04M 1/72469 |
| 2020/0278775 A1* | 9/2020 | Tao | ..................... | G06F 3/04883 |

FOREIGN PATENT DOCUMENTS

| | | |
|---|---|---|
| CN | 109521937 A | 3/2019 |
| CN | 109558046 A | 4/2019 |
| CN | 109885153 A | 6/2019 |

OTHER PUBLICATIONS

Extended European search report of counterpart EP application No. 20152176.2 dated Aug. 28, 2020.
Second office action of Chinese application No. 201910672203.8 dated Jan. 6, 2021.

* cited by examiner

SCREEN DISPLAY METHOD AND DEVICE, MOBILE TERMINAL AND STORAGE MEDIUM

CROSS-REFERENCE TO RELATED APPLICATION

This application claims priority to Chinese Patent Application No. 201910672203.8 filed on Jul. 24, 2019, the disclosure of which is hereby incorporated by reference in its entirety.

BACKGROUND

Currently, a mobile terminal such as a mobile phone or a tablet computer includes a processor, a housing, and a display screen. The processor is arranged in the housing, and the display screen is arranged on a front surface of the housing. Generally, when the mobile terminal is not used, a user often puts the mobile terminal on a desk or in a backpack. When the user wants to use and take the mobile terminal, he/she usually finds that the display screen facing away him/her. At this time, the user needs to flip the mobile terminal to face the display screen prior to using the mobile terminal.

SUMMARY

Various embodiments of the present disclosure provides a screen display method and device, a mobile terminal.

According to an aspect of an embodiment of the present disclosure, there is provided a screen display method, including:

acquiring screen status (includes 2 states that are: turned-on, turned-off) when a specified operation is received, the screen status being status of the first display screen and/or status of the second display screen;

selecting a display screen from the first display screen and the second display screen according to the screen status and the specified operation; and displaying a first current interface on the selected display screen.

In the embodiment of the present disclosure, since the mobile terminal can select the display screen from the first display screen and the second display screen according to the screen status and the specified operation, when the user wants to use the mobile terminal, he/she can select a main screen only by issuing one specified operation, without flipping the mobile terminal to face the main screen. Thus, the display efficiency is improved. Meanwhile, the convenience and the operability of the mobile terminal are improved, and the user experience of the mobile terminal is enhanced.

In another possible implementation, selecting the display screen from the first display screen and the second display screen according to the screen status and the specified operation includes:

determining a first target display screen on which the specified operation is triggered when the screen status is the turned-off state, and selecting the display screen from the first display screen and the second display screen according to the first target display screen.

In another possible implementation, selecting the display screen from the first display screen and the second display screen according to the first target display screen includes:

selecting the first display screen when the first target display screen is the first display screen; or selecting the second display screen when the first target display screen is the second display screen.

In the embodiment of the present disclosure, since the mobile terminal can select the display screen from the first display screen and the second display screen according to the screen status and the specified operation, the user can use a display screen that he/she wants to use by triggering the specified operation on this display screen, without flipping the mobile terminal to face the main screen. Thus, the display efficiency is improved, and the user experience of the mobile terminal is enhanced.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and selecting the display screen from the first display screen and the second display screen according to the first target display screen includes:

selecting a display screen associated with the first target display screen when the first target display screen is the third display screen or the fourth display screen, or selecting a specified display screen when the first target display screen is the third display screen or the fourth display screen, or selecting a display screen upper in the direction of gravity when the first target display screen is the third display screen or the fourth display screen.

In the embodiment of the present disclosure, the mobile terminal can select the display screen from the first display screen and the second display screen according to the screen status and the specified operation, so that the use can select a display screen that he/she wants to use by triggering the specified operation on a side display screen associated with this display screen; or the user can select a display screen specified by him/her by triggering the specified operation on any one of side display surfaces; or the mobile terminal selects the display screen with the upward gravity when the user triggers the specified operation on any one of side display screens. In this way, when the user wants to use the mobile terminal, he/she can select a main screen only by issuing one specified operation, without flipping the mobile terminal to face the main screen. Thus, the display efficiency is improved. Meanwhile, the convenience and the operability of the mobile terminal are improved, and the user experience of the mobile terminal is enhanced.

In another possible implementation, selecting the display screen from the first display screen and the second display screen according to the screen status and the specified operation includes:

determining a second target display screen for currently displaying a second current interface when the screen status is the turned-on state, the second target display screen being the first display screen or the second display screen; and selecting the display screen from the first display screen and the second display screen according to the second target display screen and the specified operation.

In another possible implementation, selecting the display screen from the first display screen and the second display screen according to the second target display screen and the specified operation includes:

selecting a display screen other than the second target display screen from the first display screen and the second display screen when the specified operation is a flip operation; or selecting the second display screen when the second target display screen is the first display screen and the first target display screen on which the specified operation is triggered is the second display screen; or selecting the first display screen when the second target display screen is the second display screen and the first target display screen on which the specified operation is triggered is the first display screen.

In the embodiment of the present disclosure, when the user wants to switch to the main screen of the mobile terminal, he/she can switch a non-main screen to the main screen only by performing a specified operation such as flipping the mobile terminal or clicking the non-main screen, so that the convenience and the operability of the mobile terminal are improved, and the user experience of the mobile terminal is enhanced.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and selecting the display screen from the first display screen and the second display screen according to the second target display screen and the specified operation includes:

determining a first target display screen on which the specified operation is triggered, and selecting a display screen associated with the first target display screen when the first target display screen is the third display screen or the fourth display screen and the display screen associated with the first target display screen is different from the second target display screen.

In the embodiment of the present disclosure, when the user wants to switch to the main screen of the mobile terminal, he/she can switch a non-main screen to the main screen only by clicking a side screen associated with the non-main screen, so that the convenience and the operability of the mobile terminal are improved, and the user experience of the mobile terminal is enhanced.

In another possible implementation, displaying the first current interface on the selected display screen includes:

turning on the selected display screen when the screen status is the turned-off state; and displaying the first current interface on the selected display screen.

In another possible implementation, the method further includes: displaying a specified picture on the unselected display screen.

In the embodiment of the present disclosure, the specified picture is displayed on the unselected display screen, so that the aesthetic pleasure of the mobile terminal is improved. Moreover, the user can also set the side screen of the mobile terminal, further improving the aesthetic pleasure and practicality of the mobile terminal, and enhancing the user experience of the mobile terminal.

In another possible implementation, the method further includes:

turning off the display screen of the mobile terminal when the first target display screen is the third display screen or the fourth display screen and the display screen associated with the first target display screen is the second target display screen.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and the display screen of the mobile terminal is turned off when the first target display screen is the third display screen or the fourth display screen.

In the embodiment of the present disclosure, the user also can also control the display screen to be turned off by triggering the specified operation. Moreover, the user can also set the mobile terminal in a personalized manner, such as setting turning off of the main screen or the non-main screen, so that the convenience and the operability of the mobile terminal are improved, and the user experience of the mobile terminal is enhanced.

According to another aspect of an embodiment of the present disclosure, there is provided a screen display device, wherein the device is applied to a mobile terminal, the mobile terminal includes a first display screen and a second display screen, the first display screen is arranged on a first front surface of a housing, the second display screen is arranged on a second front surface of the housing, and the first front surface and the second front surface are opposite surfaces; and the device includes:

an acquisition module, configured to acquire screen status when a specified operation is received, the screen status being status of the first display screen and/or status of the second display screen;

a selection module, configured to select a display screen from the first display screen and the second display screen according to the screen status and the specified operation; and a display module, configured to display a first current interface on the selected display screen.

In another possible implementation, the selection module is further configured to determine a first target display screen on which the specified operation is triggered when the screen status is the turned-off state, and select the display screen from the first display screen and the second display screen according to the first target display screen.

In another possible implementation, the selection module is further configured to select the first display screen when the first target display screen is the first display screen, or select the second display screen when the first target display screen is the second display screen.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and the selection module is further configured to select a display screen associated with the first target display screen when the first target display screen is the third display screen or the fourth display screen, or select a specified display screen when the first target display screen is the third display screen or the fourth display screen, or select a display screen upper in the direction of gravity when the first target display screen is the third display screen or the fourth display screen.

In another possible implementation, the selection module is further configured to determine a second target display screen for currently displaying a second current interface when the screen status is the turned-on state, the second target display screen being the first display screen or the second display screen; and the selection module is further configured to select the display screen from the first display screen and the second display screen according to the second target display screen and the specified operation.

In another possible implementation, the selection module is further configured to select a display screen other than the second target display screen from the first display screen and the second display screen when the specified operation is a flip operation, or select the second display screen when the second target display screen is the first display screen and the first target display screen on which the specified operation is triggered is the second display screen, or select the first display screen when the second target display screen is the second display screen and the first target display screen on which the specified operation is triggered is the first display screen.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and the selection module is further configured to determine a first target display screen on which the specified operation is triggered, and select a display screen associated with the first target display screen when the first target display screen is the third display screen or the fourth display screen and the display screen associated with the first target display screen is different from the second target display screen.

In another possible implementation, the display module is further configured to turn on the selected display screen when the screen status is the turned-off state, and display the first current interface on the selected display screen.

In another possible implementation, the display module is further configured to display a specified picture on the unselected display screen.

In another possible implementation, the selection module is further configured to turn off the display screen of the mobile terminal when the first target display screen is the third display screen or the fourth display screen and the display screen associated with the first target display screen is the second target display screen.

In another possible implementation, the mobile terminal further includes a third display screen and a fourth display screen, the third display screen is arranged on the first side surface of the housing, the fourth display screen is arranged on the second side surface of the housing, and the first side surface and the second side surface are opposite surfaces; and the selection module is further configured to turn off the display screen of the mobile terminal when the first target display screen is the third display screen or the fourth display screen.

The embodiment of the present disclosure provides the screen display device. The device can acquire the screen status when receiving the specified operation, and can select the display screen from the first display screen and the second display screen according to the screen status and the specified operation. In this way, when the user wants to use the mobile terminal, he/she can select the main screen only by issuing one specified operation, without flipping the mobile terminal to face the main screen. Thus, the display efficiency is improved. Meanwhile, the convenience and the operability of the mobile terminal are improved, and the user experience of the mobile terminal is enhanced.

According to another aspect of an embodiment of the present disclosure, there is provided a mobile terminal, including:

one or more processors, and a volatile or non-volatile memory configured to store instructions executable by the one or more processors, wherein the processor is configured to:

acquire screen status when a specified operation is received, the screen status being status of the first display screen and/or status of the second display screen, select a display screen from the first display screen and the second display screen according to the screen status and the specified operation, and display a first current interface on the selected display screen According to another aspect of an embodiment of the present disclosure, there is provided a computer-readable storage medium, wherein at least one instruction is stored in the computer-readable storage medium; and when the at least one instruction is loaded and executed by a processor, the mobile terminal is caused to implement operations in the screen display method of any one of implementations in the first aspect.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Numeral references in the drawings.

Figure 1:
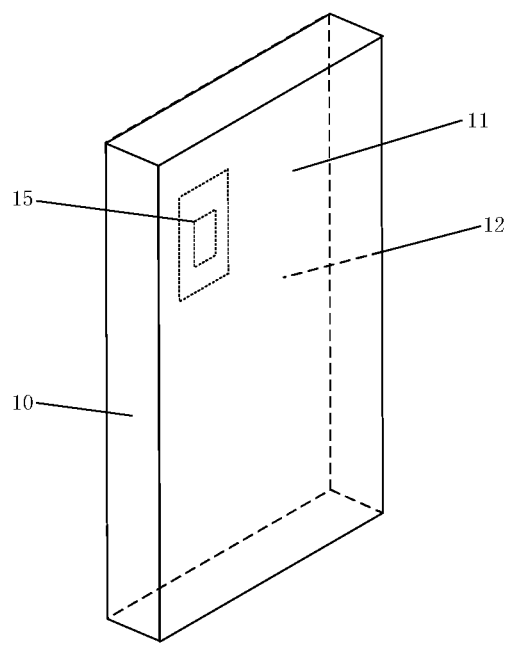
FIG. 1 is a schematic diagram of a mobile terminal according to some embodiments.

10 housing
11 first display screen
12 second display screen
13 third display screen
14 fourth display screen
15 processor

DETAILED DESCRIPTION

To make the objectives, technical solutions and advantages of the present disclosure clearer, embodiments of the present disclosure will be described in detail.

An embodiment of the present disclosure provides a mobile terminal. Referring to FIG. 1, the mobile terminal includes: a housing 10, a first display screen 11, a second display screen 12, and a processor 15.

The processor 15 is arranged in the housing 10, the first display screen 11 is arranged on a first front surface of a housing 10 of the mobile terminal, and the second display screen 12 is arranged on a second front surface of the housing 10; and the first front surface and the second front surface are opposite surfaces.

The processor 15 is configured to acquire screen status (includes 2 states that are: turned-on, turned-off) when receiving a specified operation, select the display screen from the first display screen 11 and the second display screen 12, and display a first current interface on the selected display screen, wherein the screen status is the status of the first display screen 11 and/or the status of the second display screen 12.

In a possible implementation, the first display screen 11 and the second display screen 12 may be two independent screens. In addition, the first display screen 11 and the second display screen 12 may be made of the same material or different materials. For example, the first display screen 11 and the second display screen 12 are made of the same material, and are flexible screens, so that the service life of the mobile terminal is prolonged.

The first display screen 11 is arranged on the first front surface of the housing 10 of the mobile terminal, and the size of the first display screen 11 may be the same as or smaller than that of the first front surface of the housing 10. When the size of the first display screen 11 and the size of the first front surface of the housing 10 are the same, the first display screen 11 of the mobile terminal is a full screen. When the size of the first display screen 11 is smaller than that of the first front surface of the housing 10, the first display screen 11 of the mobile terminal is a non-full screen. That is, the first display screen 11 of the mobile terminal is a display screen with a frame. Moreover, the size of the first display screen 11 can be set and changed as needed. In the embodiment of the present disclosure, the size of the first display screen 11 is not specifically limited. For example, the length and the width of the first front surface of the housing 10 may be set to 12 cm and 6.5 cm, respectively, and the length and the width of the first display screen 11 may be set to 12 cm and 6 cm, respectively.

The second display screen 12 is arranged on the second front surface of the housing 10, and the first front surface and the second front surface are opposite surfaces. The size of the second display screen 12 and the size of the first display screen 11 may be the same or different. Moreover, the size of the second display screen 12 may also be set and changed as needed. In the embodiment of the present disclosure, the size of the second display screen 12 is not specifically limited. For example, the size of the second display screen 12 is the same as that of the first display screen 11, and the length and the width of the second display screen 12 may be set to 12 cm and 6 cm.

In the embodiment of the present disclosure, since the processor 15 of the mobile terminal can select the display screen from the first display screen 11 and the second display screen 12 according to the screen status and the specified operation, and can display the first current interface on the selected display screen, the user can select the display screen of the mobile terminal according to his/her needs via the specified operation. Therefore, the convenience and the operability of the mobile terminal are improved, and the user experience of the mobile terminal is enhanced.

Figure 2:
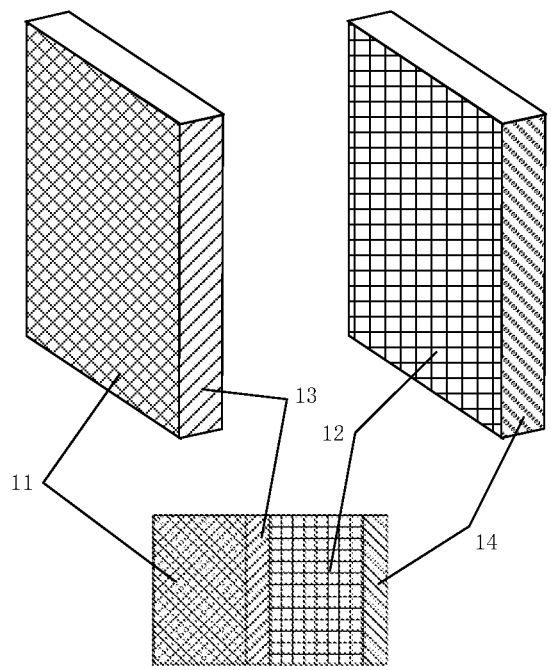
FIG. 2 is a schematic diagram of another mobile terminal according to some embodiments.

In another possible implementation, referring to FIG. 2, the mobile terminal further includes a third display screen 13 and a fourth display screen 14. The third display screen 13 is arranged on a first side surface of the housing 10; the fourth display screen 14 is arranged on a second side surface of the housing 10; and the first side surface and the second side surface are opposite surfaces.

The first side surface and the second side surface may be left and right side surfaces of the housing 10, and may be upper and lower side surfaces of the housing 10. For example, the first side surface is the side surface on the left side of the first front surface, and the second side surface is the side surface on the right side of the first front surface. That is, the third display screen 13 is located on the left side of the first display screen 11, and the fourth display screen 14 is located on the left side of the second display screen 12. For another example, the first side surface is the side surface on the right side of the first front surface, and the second side surface is the side surface on the left side of the first front surface. That is, the third display screen 13 is located on the right side of the first display screen 11, and the fourth display screen 14 is located on the right side of the second display screen 12. For another example, the first side surface is the side surface on the top of the first front surface, and the second side surface is the side surface below the first front surface. That is, the third display screen 13 is located on the top of the first display screen 11, and the fourth display screen 14 is located on the bottom of the first display screen 11. For another example, the first side surface is the side surface below the first front surface, and the second side surface is the side surface on the top of the first front surface. That is, the third display screen 13 is located on the bottom of the first display screen 11, and the fourth display screen 14 is located on the top of the first display screen 11. In the embodiment of the present disclosure, an example in which the third display screen 13 is located on the right side of the first display screen 11 and the fourth display screen 14 is located on the right side of the second display screen 12 is taken for illustration.

In a possible implementation, the third display screen 13 is associated with the first display screen 11, and the fourth display screen 14 is associated with the second display screen 12. The association of the third display screen 13 with the first display screen 11 means that when the specified operation is triggered on the third display screen 13, the first display screen 11 can be controlled to perform screen switching. Similarly, the association of the fourth display screen 14 with the second display screen 12 means that when the specified operation is triggered on the fourth display screen 14, the second display screen 12 can be controlled to perform screen switching.

In another possible implementation, both the third display screen 13 and the fourth display screen 14 are associated with a specified display screen. The association of the third display screen 13 and the fourth display screen 14 with the specified display screen means that when the specified operation is triggered on the third display screen 13 or the fourth display screen 14, the specified display screen can be controlled to perform screen switching. The specified display screen may be the first display screen 11 or the second display screen 12.

The third display screen 13 is arranged on the first side surface of the housing 10, and the length of the first side surface of the housing 10 may be set to 12 cm, 13 cm, 15 cm, etc., and the width of the first side surface may be set to 0.5 cm, 0.8 cm, 1 cm, etc. In addition, the size of the first side surface of the housing 10 can be set and changed as needed. The size of the third display screen 13 may be the same as or smaller than that of the first side surface of the housing 10. Correspondingly, the length of the third display screen 13 can be set to 12 cm, 13 cm, 15 cm, etc., and the width of the third display screen 13 can be set to 0.5 cm, 0.8 cm, 1 cm, etc. In addition, the size of the third display screen 13 can be set and changed as needed. In the embodiment of the present disclosure, the size of the third display screen 13 is not specifically limited. For example, the length and the width of the first side surface of the housing 10 may be set to 12 cm and 1 cm, respectively, and so are the length and the width of the third display screen 13.

The fourth display screen 14 is arranged on the second side surface of the housing 10. The size of the fourth display screen 14 may be the same as or smaller than that of the second side surface of the housing 10. The length of the fourth display screen 14 can be set to 12 cm, 13 cm, 15 cm, etc., and the width of the fourth display screen 14 can be set to 0.5 cm, 0.8 cm, 1 cm, etc. In addition, the size of the fourth display screen 14 can be set and changed as needed. In the embodiment of the present disclosure, the size of the fourth display screen 14 is not specifically limited. For example, the length and the width of the fourth display screen 14 may be set to 12 cm and 1 cm, respectively.

In a possible implementation, the first display screen 11, the second display screen 12, the third display screen 13, and the fourth display screen 14 may be individual screens, or may be an integral screen. When the first display screen 11, the second display screen 12, the third display screen 13, and the fourth display screen 14 are combined as a single screen, in order to beautify and improve the practicability of the mobile terminal, the lengths of the four display screens can be set the same. For example, the lengths of the four display screens are set to 12 cm.

The embodiment of the present disclosure provides the mobile terminal, further including the third display screen 13 and the fourth display screen 14. The third display screen 13 is arranged on the first side surface of the housing 10; the fourth display screen 14 is arranged on the second side surface of the housing 10; and the first side surface and the second side surface are opposite surfaces. The third display screen 13 is associated with the first display screen 11, and the fourth display screen 14 is associated with the second display screen 12. The user can select the first display screen 11 associated with the third display screen 13 or the second display screen 12 associated with the fourth display screen 14 by triggering the third display screen 13 or the fourth display screen 14 on the side of the mobile terminal, so that the convenience and the operability of the mobile terminal are improved, and the user experience of the mobile terminal is enhanced.

Figure 3:
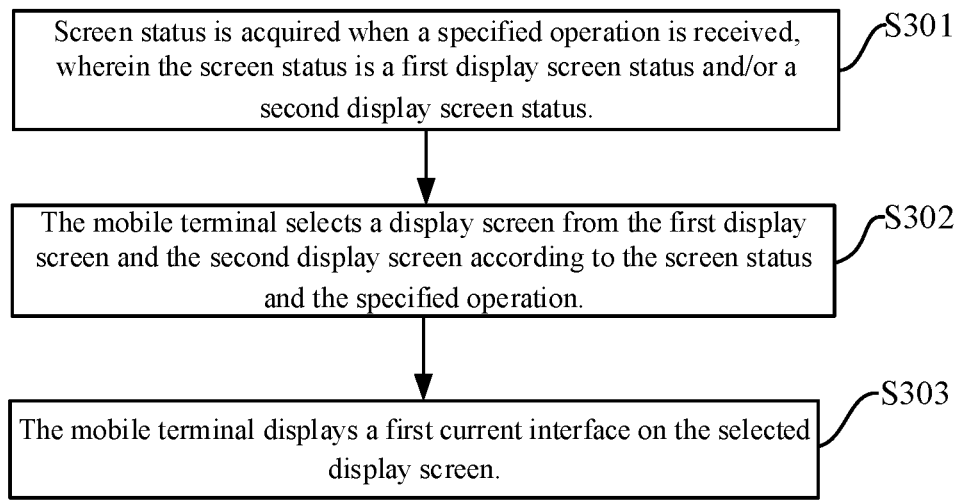
FIG. 3 is a flowchart of a screen display method according to some embodiments.

An embodiment of the present disclosure provides an application information display method applied to the foregoing mobile terminal. Referring to FIG. 3, the method includes the following steps.

In step S301, screen status is acquired when a specified operation is received, wherein the screen status is status of the first display screen and/or status of the second display screen.

In step S302, the mobile terminal selects a display screen from the first display screen and the second display screen according to the screen status and the specified operation.

In step S303, the mobile terminal displays a first current interface on the selected display screen.

In a possible implementation, selecting the display screen from the first display screen and the second display screen according to the screen status and the specified operation includes the following procedure.

A first target display screen on which the specified operation is triggered is determined when the screen status is the turned-off state, and the display screen is selected from the first display screen and the second display screen according to the first target display screen.

The display screen is selected from the first display screen and the second display screen according to the first target display screen includes the following procedure.

The first display screen is selected when the first target display screen is the first display screen; or the second display screen is selected when the first target display screen is the second display screen.

In another possible implementation, the mobile terminal further includes a third display screen and a fourth display screen. The third display screen is arranged on the first side surface of the housing; the fourth display screen is arranged on the second side surface of the housing; and the first side surface and the second side surface are opposite surfaces. The third display screen is associated with the first display screen; and the fourth display screen is associated with the second display screen.

Correspondingly, selecting the display screen from the first display screen and the second display screen according to the first target display screen includes the following procedure.

A display screen associated with the first target display screen is selected when the first target display screen is the third display screen or the fourth display screen; or a specified display screen is selected when the first target display screen is the third display screen or the fourth display screen; or a display screen upper in a direction of gravity is selected when the first target display screen is the third display screen or the fourth display screen.

In another possible implementation, selecting the display screen from the first display screen and the second display screen according to the screen status and the specified operation includes the following procedures.

A second target display screen for currently displaying a second current interface is determined when the screen status is the turned-on state, wherein the second target display screen is the first display screen or the second display screen; and the display screen is selected from the first display screen and the second display screen according to the second target display screen and the specified operation.

Selecting the display screen from the first display screen and the second display screen according to the second target display screen and the specified operation includes the following procedure.

A display screen other than the second target display screen is selected from the first display screen and the second display screen when the specified operation is a flip operation; or the second display screen is selected when the second target display screen is the first display screen and the first target display screen on which the specified operation is triggered is the second display screen; or the first display screen is selected when the second target display screen is the second display screen and the first target display screen on which the specified operation is triggered is the first display screen.

In another possible implementation, the mobile terminal further includes a third display screen and a fourth display screen. The third display screen is arranged on a first side surface of the housing; the fourth display screen is arranged on a second side surface of the housing; and the first side surface and the second side surface are opposite surfaces.

Correspondingly, selecting the display screen from the first display screen and the second display screen according to the second target display screen and the specified operation includes the following procedures.

A first target display screen on which the specified operation is triggered is determined; and a display screen associated with the first target display screen is selected when the first target display screen is the third display screen or the fourth display screen and the display screen associated with the first target display screen is different from the second target display screen.

In another possible implementation, displaying the first current interface on the selected display screen includes: turning on the selected display screen when the screen status is the turned-off state, and displaying the first current interface on the selected display screen.

In another possible implementation, the method further includes: displaying a specified picture on the unselected display screen.

In a possible implementation, the method further includes the following steps.

The display screen of the mobile terminal is turned off when the first target display screen is the third display screen or the fourth display screen and the display screen associated with the first target display screen is the second target display screen.

In another possible implementation, the mobile terminal further includes a third display screen and a fourth display screen. The third display screen is arranged on the first side surface of the housing; the fourth display screen is arranged on the second side surface of the housing; and the first side surface and the second side surface are opposite surfaces.

The display screen of the mobile terminal is turned off when the first target display screen is the third display screen or the fourth display screen.

In the embodiment of the present disclosure, since the processor of the mobile terminal can select the display screen from the first display screen and the second display screen according to the screen status and the specified operation, and can display the first current interface on the selected display screen, the use can select the display screen of the mobile terminal according to his/her needs via the specified operation, and can also select the display screen of the mobile terminal via the specified operation on a display screen on a side surface of the mobile terminal. Therefore, the convenience and the operability of the mobile terminal are improved, and the user experience of the mobile terminal is enhanced.

When the user triggers the mobile terminal to switch the display screen, he/she may trigger a specified operation on the mobile terminal, wherein the specified operation may be a click operation on the display screen, a double-click operation on the display screen, a flip operation on the mobile terminal or a slide operation on the display screen, etc. When the specified operation is the click operation, the double-click operation, or the slide operation, the display screen on which the specified operation is triggered may be any one of the display screens. The slide operation may be an operation of sliding to the right, an operation of sliding upward, an operation of drawing a specified pattern, or the like. The specified pattern may be any pattern such as a circle or a triangle.

A first target display screen on which the specified operation is triggered is determined when the display screen of the mobile terminal is in the turned-off state. The display screen is selected from the first display screen and the second display screen according to the first target display screen. That is, the above is implemented by the following first implementation. A second target display screen for currently displaying a second current interface is determined when the screen of the mobile terminal is in the turned-on state; and the second target display screen is the first display screen or the second display screen. The display screen is selected from the first display screen and the second display screen according to the second target display screen and the specified operation. That is, the above is implemented by the following second implementation.

In the first implementation, when the display screen of the mobile terminal is in the turned-off state, the user can trigger the mobile terminal to switch the display screen via the following four manners.

(1) The mobile terminal turns on a display screen on which the user triggers the specified operation, wherein the display screen is the first display screen or the second display screen. The first current interface is displayed on the turned-on display screen. For example, when the user triggers the specified operation on the first display screen, the mobile terminal turns on the first display screen; and the first current interface is displayed on the first display screen.

(2) The mobile terminal turns on a display screen when the user triggers the specified operation on the third display screen or the fourth display screen, wherein the display screen is associated with the third display screen or the fourth display screen. The first current interface is displayed on the turned-on display screen. For example, when the user triggers the specified operation on the third display screen, the mobile terminal turns on the first display screen; and the first current interface is displayed on the first display screen.

(3) The mobile terminal turns on a specified display screen when the user triggers the specified operation on the third display screen or the fourth display screen; and the first current interface is displayed on the turned-on specified display screen. The specified display screen may be the first display screen or the second display screen. For example, when the specified display screen is the first display screen and the user triggers the specified operation on the third display screen or the fourth display screen, the mobile terminal turns on the first display screen; and the first current interface is displayed on the turned-on first display screen.

(4) The mobile terminal turns on a display screen with gravity upward when the user triggers the specified operation on the third display screen or the fourth display screen; and the first current interface is displayed on the turned-on display screen with the gravity upward. For example, when the display screen with the gravity upward is the first display screen and the user triggers the specified operation on the third display screen or the fourth display screen, the mobile terminal turns on the first display screen.

Figure 4:
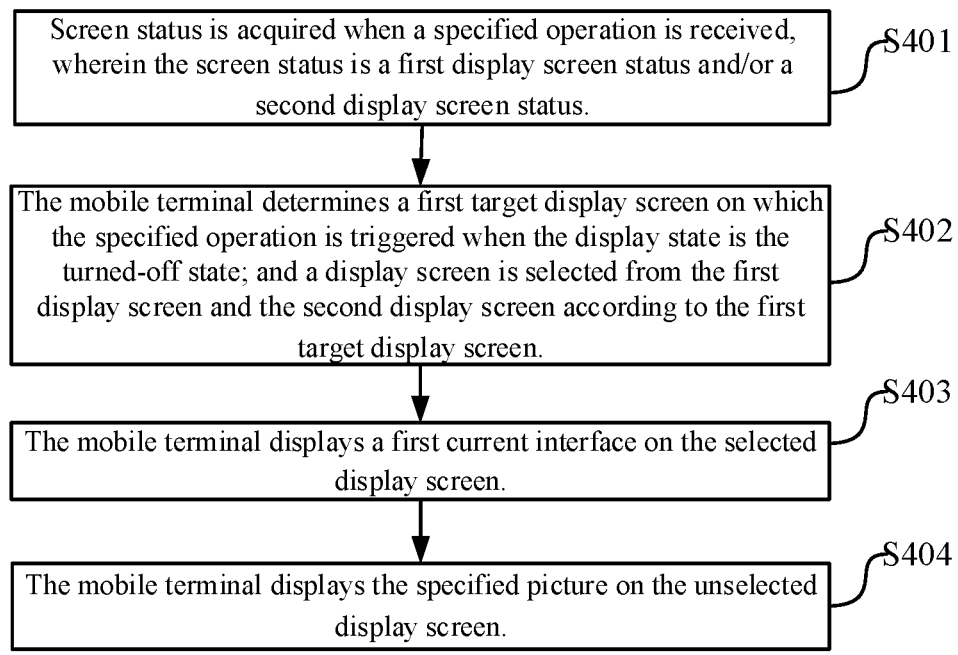
FIG. 4 is a flowchart of another screen display method according to some embodiments.

In the first implementation, an embodiment of the present disclosure provides a screen display method applied to the foregoing mobile terminal. Referring to FIG. 4, in this embodiment of the present disclosure, the first implementation is taken as an example for illustration. The method includes the following steps.

In step S401, screen status is acquired when a specified operation is received, wherein the screen status is status of the first display screen and/or status of the second display screen.

In a possible implementation, the mobile terminal acquires a display screen with gravity upward, and acquires a state of the display screen with the gravity upward. For example, when the first display screen is the display screen with the gravity upward, the mobile terminal acquires screen status of the first display screen; when the second display screen is the display screen with the gravity upward, the mobile terminal acquires screen status of the second display screen.

In another possible implementation, the mobile terminal acquires a first screen status of the first display screen and a second screen status of the second display screen, and determines screen status according to the first screen status and the second screen status. When both the first screen status and the second screen status are the turned-on state, the mobile terminal determines that the screen status is the turned-on state. When both the first screen status and the second screen status are the turned-off state, the mobile terminal determines that the screen status is the turned-off state. When one of the first screen status and the second screen status is the turned-on state, and the other of the first screen status and the second screen status is the turned-off state, the mobile terminal determines that the screen status is the turned-on state.

In step S402, the mobile terminal determines a first target display screen on which the specified operation is triggered when the display state is the turned-off state; and a display screen is selected from the first display screen and the second display screen according to the first target display screen.

Correspondingly, this step can be implemented by the steps (1) and (2) as follows.

(1) The mobile terminal determines the first target display screen on which the specified operation is triggered.

Determining, by the mobile terminal, the first target display screen on which the specified operation is triggered includes: determining, by the mobile terminal, a display screen on which the specified operation is triggered, and using the display screen on which the specified operation is triggered as the first target display screen.

The first target display screen may be the first display screen, the second display screen, the third display screen, or the fourth display screen. Correspondingly, if the display screen on which the specified operation is triggered is the first display screen, the first target display screen is the first display screen; or if the display screen on which the specified operation is triggered is the second display screen, the first target display screen is the second a display screen; or if the display screen on which the specified operation is triggered is the third display screen, the first target display screen is the third display screen; or if the display screen on which the specified operation is triggered is the fourth display screen, the first target display screen is the fourth display screen.

In this step, the mobile terminal may further determine a target region in the first target display screen on which the specified operation is triggered, and subsequently switches the screen in combination with the target region.

(2) The mobile terminal selects a display screen from the first display screen and the second display screen according to the first target display screen.

In a possible implementation, the mobile terminal selects a display screen on which the user triggers the specified operation. Correspondingly, when the first target display screen is the first display screen, the mobile terminal selects the first display screen. When the first target display screen is the second display screen, the mobile terminal selects the second display screen.

In the embodiment of the present disclosure, since the mobile terminal can select the display screen from the first display screen and the second display screen according to the screen status and the specified operation, the use can use the display screen that he/she wants to use by clicking the display screen. In this way, when the user wants to use the mobile terminal, he/she can select a main screen only by issuing one specified operation, without flipping the mobile terminal to face the main screen. Thus, the display efficiency is improved. Moreover, the user can also set the specified operation in a personalized manner, so that the convenience and the operability of the mobile terminal are improved, and the user experience of the mobile terminal is enhanced.

In another possible implementation, the mobile terminal further includes a third display screen and a fourth display screen. The third display screen is arranged on a first side surface of the housing; the fourth display screen is arranged on a second side surface of the housing; and the first side surface and the second side surface are opposite surfaces. Correspondingly, selecting, by the mobile terminal, a display screen from the first display screen and the second display screen according to the first target display screen has the following three implementation manners.

In the first implementation manner, the mobile terminal selects a display screen associated with a side screen on which the user triggers the specified operation. Correspondingly, the step of selecting, by the mobile terminal, the display screen from the first display screen and the second display screen according to the first target display screen may include: selecting, by the mobile terminal, the display screen associated with the first target display screen when the first target display screen is the third display screen or the fourth display screen.

When the first target display screen is the third display screen, the mobile terminal selects the first display screen associated with the third display screen. When the first target display screen is the fourth display screen, the mobile terminal selects the second display screen associated with the fourth display screen.

In a possible implementation, the mobile terminal selects the first display screen associated with the third display screen or the second display screen associated with the fourth display screen as long as the user triggers the specified operation on the third display screen or the fourth display screen.

In another possible implementation, the mobile terminal may set a first button region on the third display screen. Only when the use triggers the specified operation in the first button region can the mobile terminal trigger screen switching. Correspondingly, prior to selecting the first display screen associated with the third display screen, the mobile terminal determines whether the target region on which the specified operation is triggered is within the first button region. When the target region is within the first button region, the mobile terminal selects the first display screen associated with the third display screen. When the target region is not in the first button region, the mobile terminal does not perform any operation, or outputs first prompt information. The first prompt information is configured to remind the user to trigger the specified operation in the first button region, or to perform a control instruction corresponding to a specified operation performed in a region other than the first button region. The region other than the first button region refers to a region other than the first button region in the third display screen. For example, the user may trigger a specified operation in the region other than the first button region to trigger the mobile terminal to increase or decrease the volume; and the mobile terminal controls the volume to increase or decrease according to the specified operation.

The first button region is smaller than the third display screen in size, and may be any region of the third display screen. For example, the first button region may be an upper half region of the third display screen, or a middle region of the third display screen, or a lower half region of the third display screen. In the embodiment of the present disclosure, the position of the first button region on the third display screen is not specifically limited, and may be set and changed as needed. For example, the button region is set in the middle of the third display screen.

The shape of the first button region may be set discretionarily. For example, the shape of the first button region may be a circle, a square, or a rectangle. In the embodiment of the present disclosure, the size and the shape of the first button region are not specifically limited, and may be set and changed as needed. For example, the shape of the first button region is set to a rectangle with the length of 5 cm and the width of 1 cm.

Similarly, the mobile terminal can set a second button region on the fourth display screen. Only when the use triggers the specified operation in the second button region can the mobile terminal trigger screen switching. Correspondingly, prior to selecting the second display screen associated with the fourth display screen, the mobile terminal determines whether the target region on which the specified operation is triggered is within the second button region. When the target region is within the second button region, the mobile terminal selects the second display screen associated with the fourth display screen. When the target region is not in the second button region, the mobile terminal does not perform any operation, or outputs second prompt information. The second prompt information is configured to prompt the user to trigger the specified operation in the second button region, or to perform a control instruction corresponding to a specified operation performed in a region other than the second button region. The region other than the second button region refers to a region other than the second button region in the fourth display screen. For example, the user may trigger a specified operation in the region other than the second button region to trigger the mobile terminal to increase or decrease the volume; and the mobile terminal controls the volume to increase or decrease according to the specified operation.

The second button region is smaller than the fourth display screen in size, and may be any region of the fourth display screen. For example, the second button region may be an upper half region of the fourth display screen, or a middle region of the fourth display screen, or a lower half region of the fourth display screen. In the embodiment of the present disclosure, the position of the second button region on the fourth display screen is not specifically limited, and may be set and changed as needed. For example, the button region is set in the middle of the fourth display screen.

The shape of the second button region may be set discretionarily. For example, the shape of the second button region may be a circle, a square, or a rectangle. In the embodiment of the present disclosure, the size and the shape of the second button region are not specifically limited, and may be set and changed as needed. For example, the shape of the second button region is set to a rectangle with the length of 5 cm and the width of 1 cm.

In the embodiment of the present disclosure, since the mobile terminal can select the display screen from the first display screen and the second display screen according to the screen status and the specified operation, the user can use a display screen that he/she wants to use by clicking a side display screen associated with the display screen. In this way, when the user wants to use the mobile terminal, he/she can select a main screen only by issuing one specified operation, without flipping the mobile terminal to face the main screen. Thus, the display efficiency is improved. Moreover, the user can also set the specified operation in a personalized manner, so that the convenience and the operability of the mobile terminal are improved, and the user experience of the mobile terminal is enhanced.

In the second implementation manner, the mobile terminal selects a specified display screen regardless of which side screen on which the user triggers the specified operation. Correspondingly, the procedure of selecting, by the mobile terminal, the display screen from the first display screen and the second display screen according to the first target display screen may include: selecting the specified display screen when the first target display screen is the third display screen or the fourth display screen.

The specified display screen may be the first display screen or the second display screen. When the specified display screen is the first display screen, in a possible implementation, both the third display screen and the fourth display screen are associated with the first display screen. When the first target display screen is the third display screen or the fourth display screen, the mobile terminal selects the first display screen.

When the specified display screen is the second display screen, in a possible implementation, both the third display screen and the fourth display screen are associated with the second display screen. When the first target display screen is the third display screen or the fourth display screen, the mobile terminal selects the second display screen.

In the embodiment of the present disclosure, since the mobile terminal can select the specified display screen from the first display screen and the second display screen according to the screen status and the specified operation, the user can select a display screen specified by him/her by clicking any one of the side display screens. Moreover, the user can also set the specified operation in a personalized manner, so that the convenience and the operability of the mobile terminal are improved, and the user experience of the mobile terminal is enhanced.

In the third implementation manner, the mobile terminal selects a display screen with gravity upward regardless of which side screen on which the user triggers the specified operation. Correspondingly, the step of selecting, by the mobile terminal, the display screen from the first display screen and the second display screen according to the first target display screen may include: selecting, by the mobile terminal, the display screen with the gravity upward when the first target display screen is the third display screen or the fourth display screen.

Selecting, by the mobile terminal, the display screen with the gravity upward can be implemented by the steps (a) and (b) as follows.

(a) The mobile terminal acquires gravity sensing information thereof.

The mobile terminal includes a gravity sensor. The mobile terminal acquires the gravity sensing information thereof by using the gravity sensor.

(b) The mobile terminal determines the display screen with the gravity upward according to the gravity sensing information, and selects the display screen with the gravity upward.

When determining that the display screen with the gravity upward is the first display screen based on the gravity sensing information, the mobile terminal selects the first display screen. When determining that the display screen with the gravity upward is the second display screen based on the gravity sensing information, the mobile terminal selects the second display screen.

In the embodiment of the present disclosure, the mobile terminal selects the display screen with the gravity upward regardless of which side screen on which the user triggers the specified operation. In this way, when the user wants to use the mobile terminal, he/she can select a main screen only by clicking any one of the side display screens, without flipping the mobile terminal to face the main screen, so that the display efficiency is improved, and the user experience of the mobile terminal is enhanced.

In step S403, the mobile terminal displays a first current interface on the selected display screen.

The above step may include: turning on, by the mobile terminal, the selected display screen when the screen status is the turned-off state; and displaying the first current interface on the selected display screen. The first current interface is an interface displayed on the display screen prior to switching. Moreover, the first current interface may be a main interface of the mobile terminal, or may be an application interface of the mobile terminal. For example, the mobile terminal displays the main interface thereof on the first display screen. When selecting the second display screen for displaying according to the method provided by the embodiment of the present disclosure, the mobile terminal displays the main interface thereof on the second display screen. In addition, display information in the first current interface may include at least one of text information, picture information, and a video interface.

It should be noted that when the selected display screen is in an unlocked state, the mobile terminal directly displays current content on the selected display screen. When the selected display screen is in a locked state, before the mobile terminal displays the first current interface on the selected display screen, the selected display screen is unlocked when an unlocking operation on the selected display screen is received. Then, the first current interface is displayed on the selected display screen.

In the embodiment of the present disclosure, before the mobile terminal displays the first current interface on the selected display screen, the user performs unlocking on the selected display screen. Only when the unlocking is successful can the mobile terminal display the first current interface on the selected display screen, so that the security performance of the mobile terminal is improved.

It should be also noted that when the user performs a specified operation on the display screen, the mobile terminal may also acquire fingerprint information of the user based on the specified operation, and verifies the user based on the fingerprint information. When the verification passes and the display screen is selected, first, the selected display screen is unlocked, and then the first current interface is displayed on the selected display screen.

In the embodiment of the present disclosure, the mobile terminal may further acquire fingerprint information of the user based on the specified operation, verifies the user based on the fingerprint information, directly performs unlocking when the verification passes, and displays the first current interface on the selected display screen. Thus, the security performance of the mobile terminal is improved, and the selected display screen can be unlocked without the user separately performing the unlocking operation, thereby improving the display efficiency.

In another possible implementation, the mobile terminal displays the first current interface only on the selected display screen, and the unselected display screen remains in the turned-off state, so that power of the mobile terminal is saved, and the life time of the mobile terminal is prolonged. The mobile terminal displays a specified picture on the unselected display screen. Correspondingly, referring to FIG. 4, after step S403, step S404 is further included.

In step S404, the mobile terminal displays the specified picture on the unselected display screen.

The specified picture may be a system default picture, or may be a picture set by the user. In addition, the specified picture may be a background image or an animation image. The unselected display screen may be an unselected display screen in the first display screen and the second display screen, or may be an unselected display screen in the first display screen, the second display screen, the third display screen, and the fourth display screen.

When the unselected display screen is the unselected display screen in the first display screen and the second display screen, the first display screen and the second display screen may correspond to the same first specified picture, or may also correspond to different first specified pictures. When the first display screen and the second display screen correspond to the different first specified pictures, the step of displaying, by the mobile terminal, the specified picture on the unselected display screen may include: acquiring, by the mobile terminal, a specified picture corresponding to the unselected display screen according to the unselected display screen; and displaying the specified picture on the unselected display screen. In addition, the mobile terminal can control the third display screen and the fourth display screen to remain in the turned-off state.

When the unselected display screen is the unselected display screen in the first display screen, the second display screen, the third display screen, and the fourth display screen, the mobile terminal can display the first specified picture on the unselected display screen in the first display screen and the second display screen, and can display a second specified picture on the unselected display screen in the third display screen and the fourth display screen. The second specified picture may be the same as or different from the first specified picture. For example, the second specified picture may be a background image or animation image the same as the first specified picture, or may be a relatively cool color background set by the user.

In another possible implementation, the mobile terminal may further display third prompt information on the third display screen and the fourth display screen for reminding the user of content information displayed on the main screen.

In another possible implementation, when the user does not perform any operation on the mobile terminal beyond a first time threshold, the third prompt and the fourth display screen may further display fourth prompt information for reminding the user of turning off of the screen. The fourth prompt information may remind the user of turning off of the screen by a text or by flashing. The first time threshold can be set and changed as needed, and for example, may be set to 20 seconds.

It should be noted that the execution order of step S403 and step S404 is not limited. Step S403 may be executed prior to step S404; or step S404 may be performed prior to step S403; or step S403 and step S404 may be executed simultaneously.

In the embodiment of the present disclosure, the specified picture is displayed on the unselected display screen, so that the aesthetic pleasure of the mobile terminal is improved. The user can also set the side screen of the mobile terminal, and a reminder function is additionally provided. Thus, the practicality and the aesthetic pleasure of the mobile terminal are improved, and the user experience of the mobile terminal is enhanced.

In a second implementation, when the display screen of the mobile terminal is in turned-on state, in order to describe conveniently, a display screen which is in the turned-on state and displays the second current interface is referred to as a main screen. A display screen other than the main screen in the first display screen and the second display screen is referred to as a non-main screen. The third display screen and the fourth display screen are referred to as side screens. The user can trigger the mobile terminal to switch the display screen by the following three manners.

(1) When the user flips the mobile terminal, the mobile terminal switches the main screen to the other screen. In order to distinguish conveniently, a current interface displayed on the main screen prior to flipping is referred to as a second current interface, and a current interface displayed on the main screen after flipping is referred to as a first current interface. For example, when the main screen is the first display screen, the second current interface is displayed on the first display screen; when the user flips the mobile terminal, the mobile terminal displays the first current interface on the second display screen.

(2) When the user triggers the specified operation on the non-main screen, the mobile terminal switches the main screen to the non-main screen. In order to distinguish conveniently, a current interface displayed on the main screen before the specified operation is triggered is referred to as the second current interface, and a current interface displayed on the main screen after the specified operation is triggered is referred to as the first current interface. For example, when the main screen is the first display screen, the second current interface is displayed on the first display screen; when the user triggers the specified operation on the second display screen, the mobile terminal displays the first current interface on the second display screen.

(3) When the user triggers the specified operation on a side screen associated with the non-main screen, the mobile terminal switches the main screen to the non-main screen. In order to distinguish conveniently, a current interface displayed on the main screen before the specified operation is triggered is referred to as the second current interface, and a current interface displayed on the main screen after the specified operation is triggered is referred to as the first current interface. For example, when the main screen is the first display screen, the second current interface is displayed on the first display screen; when the user triggers the specified operation on the fourth display screen associated with the second display screen, the mobile terminal displays the first current interface on the second display screen.

It should be emphasized that the user can also trigger the specified operation in the following two manners to control the display screen to be turned off.

(A) When the user triggers the specified operation on a side screen associated with the main screen, the mobile terminal turns off the display screen.

(B) When the user triggers the specified operation on any one of side screens, the mobile terminal turns off the display screen.

It should be noted that the mobile terminal can turn off all display screens of the mobile terminal; and the mobile terminal may also turn off a part of the display screens of the mobile terminal. When the mobile terminal turns off a part of the display screens of the mobile terminal, the first display screen and/or the second display screen can be turned off.

Figure 5:
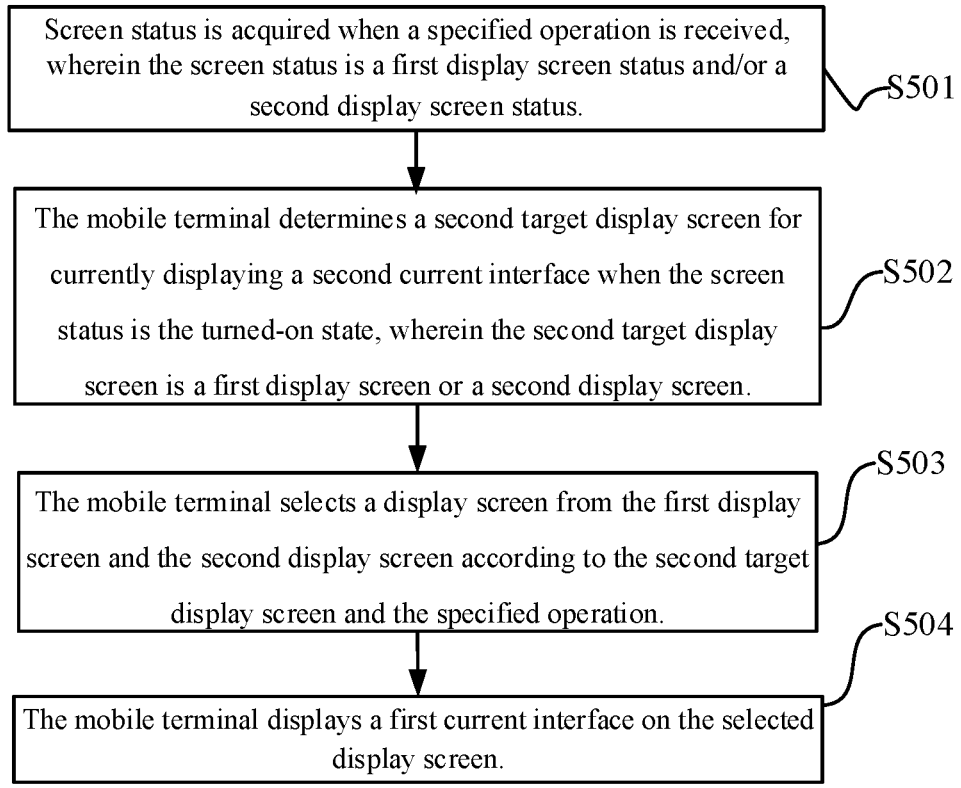
FIG. 5 is a flowchart of yet another screen display method according to some embodiments.

In the second implementation, an embodiment of the present disclosure provides a screen display method applied to the foregoing mobile terminal. Referring to FIG. 5, in this embodiment of the present disclosure, the second implementation is taken as an example for illustration. The method includes the following steps.

In step S501, screen status is acquired when a specified operation is received, wherein the screen status is status of the first display screen and/or status of the second display screen.

Step S501 is the same as step S401, and will not be repeated herein.

In step S502, the mobile terminal determines a second target display screen for currently displaying a second current interface when the screen status is the turned-on state, wherein the second target display screen is a first display screen or a second display screen.

As the second target display screen is the first display screen or the second display screen, correspondingly, the second target display screen is the first display screen when the mobile terminal determines that a display screen for currently displaying the second current interface is the first display screen, or the second target display screen is the second display screen when the mobile terminal acquires that a display screen for currently displaying the second current interface is the second display screen.

In step S503, the mobile terminal selects a display screen from the first display screen and the second display screen according to the second target display screen and the specified operation.

First, when the user performs a flip operation on the mobile terminal, the mobile terminal switches the main screen to the non-main screen. Correspondingly, this step may include: selecting, by the mobile terminal, a display screen other than the second target display screen from the first display screen and the second display screen when the specified operation is the flip operation.

Correspondingly, when the user flips the mobile terminal, the mobile terminal switches the main screen to the other screen. In order to distinguish conveniently, a current interface displayed on the main screen prior to flipping is referred to as a second current interface, and a current interface displayed on the main screen after flipping is referred to as a first current interface. For example, when the main screen is the first display screen, the second current interface is displayed on the first display screen; when the user flips the mobile terminal, the mobile terminal displays the first current interface on the second display screen.

In the embodiment of the present disclosure, when the user wants to switch the main screen of the mobile terminal to another display screen to display the first current interface on this display screen, he/she only needs to flip the mobile terminal, so that the convenience and the operability of the mobile terminal are improved, and the user experience of the mobile terminal is enhanced.

Second, when the user triggers the specified operation on the non-main screen, the mobile terminal switches the main screen to the non-main screen. Correspondingly, the step may include: selecting the second display screen when the second target display screen is the first display screen, and the first target display screen on which the specified operation is triggered is the second display screen; or, selecting the first display screen when the second target display screen is the second display screen and the first target display screen on which the specified operation is triggered is the first display screen.

Correspondingly, when the user triggers the specified operation on the non-main screen, the mobile terminal switches the first current interface to the other screen. In order to distinguish conveniently, a current interface displayed on the main screen before the specified operation is triggered is referred to as the second current interface, and a current interface displayed on the main screen after the specified operation is triggered is referred to as the first current interface. For example, when the main screen is the first display screen, and the user triggers the specified operation on the second display screen, the mobile terminal selects the second display screen, and displays the first current interface on the second display screen.

In the embodiment of the present disclosure, when the user wants to switch the main screen of the mobile terminal to the non-main screen to display the first current interface on the non-main screen, he/she only needs to click the non-main screen, so that the convenience and the operability of the mobile terminal are improved, and the user experience of the mobile terminal is enhanced.

Third, when the user triggers the specified operation on a side screen associated with the non-main screen, the mobile terminal switches the main screen to the non-main screen. Correspondingly, the step may include: determining, by the mobile terminal, a first target display screen on which the specified operation is triggered; and selecting a display screen associated with the first target display screen when the first target display screen is the third display screen or the fourth display screen and the display screen associated with the first target display screen is different from the second target display screen.

For example, the third display screen is associated with the first display screen, and the fourth display screen is associated with the second display screen. When the second target display screen (main screen) is the first display screen and the first target display screen (non-main screen) on which the specified operation is triggered is the fourth display screen, the mobile terminal selects the second display screen, and displays the first current interface on the second display screen. When the second target display screen (main screen) is the second display screen and the first target display screen (non-main screen) on which the specified operation is triggered is the third display screen, the mobile terminal selects the first display screen, and displays the first current interface on the first display screen.

In the embodiment of the present disclosure, when the user wants to switch the main screen of the mobile terminal to the non-main screen to display the first current interface on the non-main screen, he/she only needs to click the side screen associated with the non-main screen, so that the convenience and the operability of the mobile terminal are improved, and the user experience of the mobile terminal is enhanced.

It should be noted that the first current interface and the second current interface may be the same or different. When the first current interface and the second current interface are the same, the same interface is displayed on the different display screens of the mobile terminal. That is, when the user triggers the specified operation, the mobile terminal switches the second current interface from the main screen to the other screen. When the first current interface and the second current interface are different, different current interfaces are displayed on different display screens of the mobile terminal. That is, the mobile terminal includes two substitutes. The first display screen is configured to display a current interface corresponding to one of the substitutes. The second display screen is configured to display a current interface corresponding to the other substitute. That is, when the user triggers the specified operation, the mobile terminal displays the first current interface on the other screen. The first display screen is configured to display a display interface of a part of applications of the mobile terminal; and the second display screen is configured to display a display interface of the other part of the applications of the mobile terminal.

It should be further noted that if the first current interface and the second current interface are different and the main screen (original main screen) displays the second current interface, when the user triggers the specified operation, the mobile terminal displays the first current interface on the other screen (current main screen). At this time, the mobile terminal can display the specified picture on the original main screen, or can continue displaying the second current interface on the original main screen.

It should be further noted that when the second current interface is continuously displayed on the original main screen, the original main screen can remain in the turned-on state, so that the user can simultaneously use the applications on the two display screens and can perform operations on different display screens. Or, the original main screen may be in the turned-off state, and the user only uses an application on the switched main screen and performs an operation on the switched main screen.

It should be emphasized that the user can also trigger the specified operation in the following two manners to control the display screen to be turned off.

(A) When the user triggers the specified operation on a side screen associated with the main screen, the mobile terminal turns off the display screen. Correspondingly, the method further includes the following step. The mobile terminal turns off the display screen thereof when the first target display screen is the third display screen or the fourth display screen and the display screen associated with the first target display screen is the second target display screen.

For example, the third display screen is associated with the first display screen, and the fourth display screen is associated with the second display screen. When the second target display screen (main screen) is the first display screen, and the user performs the specified operation on the third display screen (the side screen associated with the main screen), the mobile terminal turns off the display screen of the mobile terminal. When the second target display screen (main screen) is the second display screen, and the user performs the specified operation on the fourth display screen (the side screen associated with the main screen), the mobile terminal turns off the display screen of the mobile terminal.

(B) When the user triggers the specified operation on any one of side screens, the mobile terminal turns off the display screen. Correspondingly, the method further includes the following step. The mobile terminal turns off the display screen thereof when the first target display screen is the third display screen or the fourth display screen.

When the second target display screen (main screen) is the first display screen, and the user performs the specified operation on the third display screen (side screen) or the fourth display screen (side screen), the mobile terminal turns off the display screen of the mobile terminal. When the second target display screen (main screen) is the second display screen, and the user performs the specified operation on the third display screen (side screen) or the fourth display screen (side screen), the mobile terminal turns off the display screen of the mobile terminal.

It should be noted that the mobile terminal can turn off all display screens of the mobile terminal or only turn off the second target display screen (main screen) when the mobile terminal turns off the display screen of the mobile terminal.

In the embodiment of the present disclosure, the user can also control the display screen to be turned off by triggering the specified operation. Moreover, the user can also set the mobile terminal in a personalized manner, such as setting turning off of the main screen or all of the screens, so that the convenience and the operability of the mobile terminal are improved, and the user experience of the mobile terminal is enhanced.

In step S504, the mobile terminal displays a first current interface on the selected display screen.

Step S504 is the same as step S403, and will not be repeated herein.

In the embodiment of the present disclosure, since the mobile terminal can select the display screen from the first display screen and the second display screen according to the screen status and the specified operation, when the user wants to use the mobile terminal, he/she can select a main screen only by issuing one specified operation, without flipping the mobile terminal to face the main screen. Thus, the display efficiency is improved. Meanwhile, the convenience and the operability of the mobile terminal are improved, and the user experience of the mobile terminal is enhanced.

Figure 6:
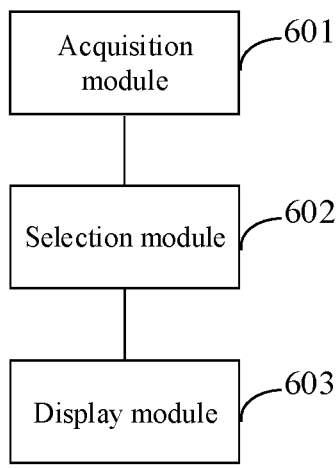
FIG. 6 is a schematic structure diagram of a screen display device according to some embodiments.

An embodiment of the present disclosure provides a screen display device applied to a mobile terminal. The mobile terminal includes a first display screen and a second display screen, wherein the first display screen is arranged on a first front surface of a housing; the second display screen is arranged on a second front surface of the housing; and the first front surface and the second front surface are opposite surfaces. Referring to FIG. 6, the device includes the following modules.

An acquisition module 601 is configured to acquire screen status when a specified operation is received, the screen status being status of the first display screen and/or status of the second display screen.

A selection module 602 is configured to select a display screen from the first display screen and the second display screen according to the screen status and the specified operation.

A display module 603 is configured to display a first current interface on the selected display screen.

In a possible implementation, the selection module 602 is further configured to determine a first target display screen on which the specified operation is triggered when the screen status is in the turned-off state, and select the display screen from the first display screen and the second display screen according to the first target display screen.

In another possible implementation, the selection module 602 is further configured to select the first display screen when the first target display screen is the first display screen, or select the second display screen when the first target display screen is the second display screen.

In another possible implementation, the mobile terminal further includes a third display screen and a fourth display screen. The third display screen is arranged on the first side surface of the housing; the fourth display screen is arranged on the second side surface of the housing; and the first side surface and the second side surface are opposite surfaces.

The selection module 602 is further configured to select a display screen associated with the first target display screen when the first target display screen is the third display screen or the fourth display screen, or select a specified display screen when the first target display screen is the third display screen or the fourth display screen, or select a display screen upper in a direction of gravity when the first target display screen is the third display screen or the fourth display screen.

In another possible implementation, the selection module 602 is further configured to determine a second target display screen for currently displaying a second current interface when the screen status is the turned-on state, the second target display screen being the first display screen or the second display screen; and the selection module 602 is further configured to select the display screen from the first display screen and the second display screen according to the second target display screen and the specified operation.

In another possible implementation, the selection module 602 is further configured to select a display screen other than the second target display screen from the first display screen and the second display screen when the specified operation is a flip operation, or select the second display screen when the second target display screen is the first display screen and the first target display screen on which the specified operation is triggered is the second display screen, or select the first display screen when the second target display screen is the second display screen and the first target display screen on which the specified operation is triggered is the first display screen.

In another possible implementation, the selection module 602 is further configured to determine a first target display screen on which the specified operation is triggered, and select a display screen associated with the first target display screen when the first target display screen is the third display screen or the fourth display screen and the display screen associated with the first target display screen is different from the second target display screen.

In another possible implementation, the display module 603 is further configured to turn on the selected display screen when the screen status is the turned-off state, and display the first current interface on the selected display screen.

In another possible implementation, the display module 603 is further configured to display a specified picture on the unselected display screen.

In another possible implementation, the selection module 602 is further configured to turn off the display screen of the mobile terminal when the first target display screen is the third display screen or the fourth display screen and the display screen associated with the first target display screen is the second target display screen.

In another possible implementation, the selection module 602 is further configured to turn off the display screen of the mobile terminal when the first target display screen is the third display screen or the fourth display screen.

The embodiment of the present disclosure provides the screen display device. The device can acquire the screen status when receiving the specified operation, and can select the display screen from the first display screen and the second display screen according to the screen status and the specified operation. Thus, the display efficiency of the mobile terminal is improved. Moreover, the user can also set the specified operation in a personalized manner, so that the convenience and the operability of the mobile terminal are improved, and the user experience of the mobile terminal is enhanced.

Figure 7:
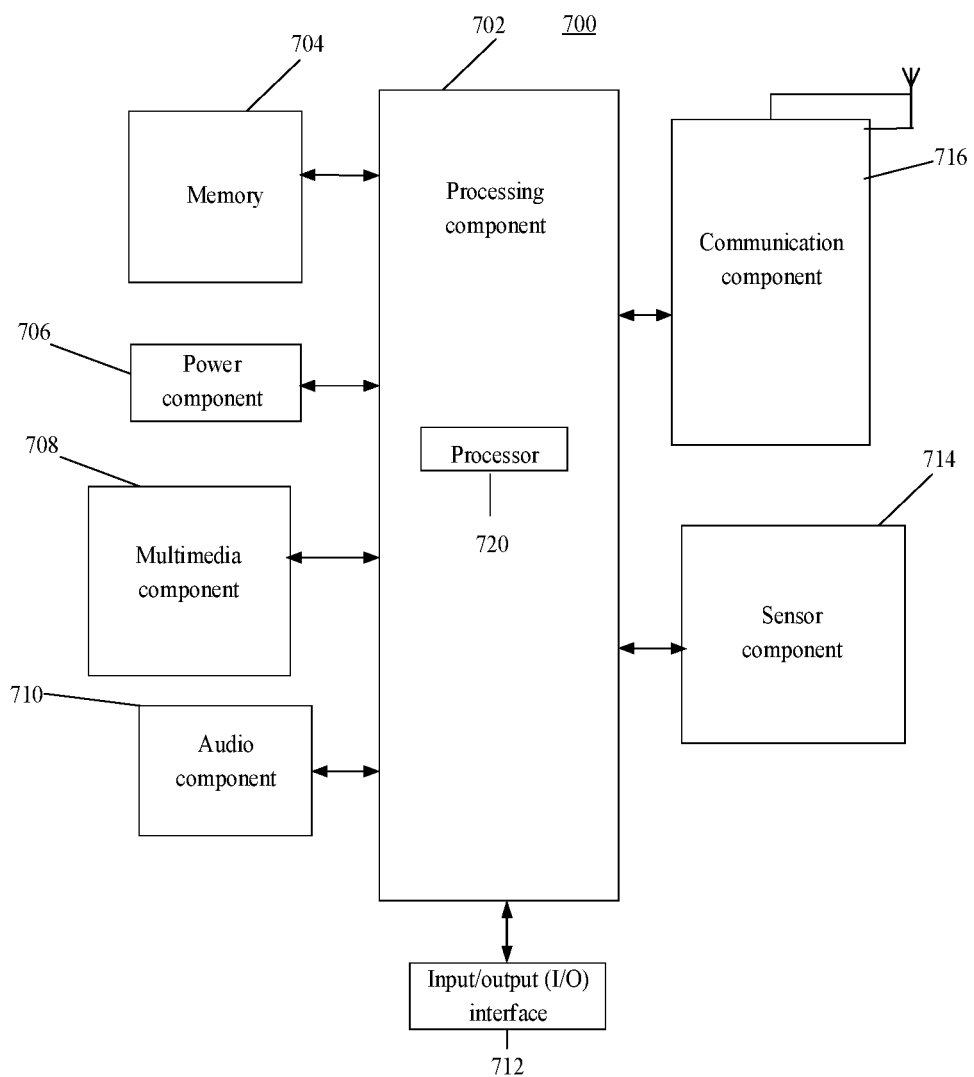
FIG. 7 is a structural block diagram of a mobile terminal according to some embodiments.

FIG. 7 is a block diagram of a mobile terminal 700 in accordance with some embodiments. For example, the mobile terminal 700 may be a mobile phone, a computer, a digital broadcast terminal, a messaging device, a gaming console, a tablet device, a medical device, a fitness equipment, a personal digital assistant, and the like.

Referring to FIG. 7, the mobile terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the mobile terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the mobile terminal 700. Examples of such data include instructions for any applications or methods operated on the mobile terminal 700, contact data, phonebook data, messages, pictures, videos, etc. The memory 704 may be implemented by using any type of volatile or non-volatile memory devices, or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory,—magnetic disk or optical disk.

The power component 706 provides power to various components of the mobile terminal 700. The power component 706 may include a power management system, one or more power sources, and any other components associated with the generation, management, and distribution of power in the mobile terminal 700.

The multimedia component 708 includes a screen providing an output interface between the mobile terminal 700 and the user. In some embodiments, the screen may include a liquid crystal display (LCD) and a touch panel (TP). In some embodiments, an organic light-emitting diode (OLED) display or other types of displays can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 708 includes a front camera and/or a rear camera. The front camera and the rear camera may receive external multimedia data while the mobile terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive external audio signals when the mobile terminal 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide status assessments of various aspects of the mobile terminal 700. For instance, the sensor component 714 may detect an on/off status of the mobile terminal 700, relative positioning of components, e.g., the display device and the mini keyboard of the mobile terminal 700, and the sensor component 714 may also detect a position change of the mobile terminal 700 or a component of the mobile terminal 700, presence or absence of user contact with the mobile terminal 700, orientation or acceleration/deceleration of the mobile terminal 700, and temperature change of the mobile terminal 700. The sensor component 714 may include a proximity sensor configured to detect the presence of nearby objects without any physical contact. The sensor component 714 may also include a optical sensor, such as a CMOS or CCD image sensor, used for imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the mobile terminal 700 and other devices. The mobile terminal 700 can access a wireless network based on a communication standard, such as Wi-Fi, 2G, 3G, 4G, or 5G, or a combination thereof. In some embodiments, the communication component 716 receives broadcast signals or broadcast associated information from an external broadcast management system via a broadcast channel. In some embodiments, the communication component 716 further includes a near field communication (NFC) module to facilitate short-range communications.

In some embodiments, the mobile terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, a non-transitory computer-readable storage medium including instructions is also provided, including instructions, executable by the processor 720 in the mobile terminal 700, for performing the above-described methods. For example, the non-transitory computer-readable storage medium may be a ROM, a RAM, a CD-ROM, a magnetic tape, a floppy disc, an optical data storage device, and the like.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A screen display method, wherein the method is applied to a mobile terminal, the mobile terminal comprises a first display screen and a second display screen, the first display screen is arranged on a first front surface of a housing of the mobile terminal, the second display screen is arranged on a second front surface of the housing, and the first front surface and the second front surface are opposite surfaces;

the mobile terminal further comprises a third display screen and a fourth display screen, the third display screen is arranged on the first side surface of the housing, the fourth display screen is arranged on the second side surface of the housing, and the first side surface and the second side surface are opposite surfaces; and the method comprises:

acquiring screen status when a specified operation is received, the screen status being status of the first display screen and/or status of the second display screen;

selecting a display screen from the first display screen and the second display screen according to the screen status and the specified operation; and displaying a first current interface on the selected display screen, wherein the selecting a display screen from the first display screen and the second display screen according to the screen status and the specified operation, comprises:

determining a first target display screen on which the specified operation is triggered when the screen status is a turned-off state, and selecting the display screen from the first display screen and the second display screen according to the first target display screen; and wherein the selecting the display screen from the first display screen and the second display screen according to the first target display screen comprises one of:

selecting a display screen associated with the first target display screen when the first target display screen is the third display screen or the fourth display screen;

selecting a specified display screen when the first target display screen is the third display screen or the fourth display screen; and selecting a display screen upper in a direction of gravity when the first target display screen is the third display screen or the fourth display screen.

2. The method of claim 1, wherein the selecting the display screen from the first display screen and the second display screen according to the first target display screen comprises at least one of:

selecting the first display screen when the first target display screen is the first display screen; or selecting the second display screen when the first target display screen is the second display screen.

3. The method of claim 1, wherein the selecting the display screen from the first display screen and the second display screen according to the screen status and the specified operation further comprises:

determining a second target display screen for currently displaying a second current interface when the screen status is a turned-on state, the second target display screen being the first display screen or the second display screen; and selecting the display screen from the first display screen and the second display screen according to the second target display screen and the specified operation.

4. The method of claim 3, wherein the selecting the display screen from the first display screen and the second display screen according to the second target display screen and the specified operation comprises one of:

selecting a display screen other than the second target display screen from the first display screen and the second display screen when the specified operation is a flip operation;

selecting the second display screen when the second target display screen is the first display screen and the first target display screen on which the specified operation is triggered is the second display screen; and selecting the first display screen when the second target display screen is the second display screen and the first target display screen on which the specified operation is triggered is the first display screen.

5. The method of claim 1, wherein the displaying the first current interface on the selected display screen comprises:

turning on the selected display screen when the screen status is a turned-off state; and displaying the first current interface on the selected display screen.

6. The method of claim 1, further comprising:

displaying a specified picture on the unselected display screen.

7. A screen display method, wherein the method is applied to a mobile terminal, the mobile terminal comprises a first display screen and a second display screen, the first display screen is arranged on a first front surface of a housing of the mobile terminal, the second display screen is arranged on a second front surface of the housing, and the first front surface and the second front surface are opposite surfaces; the mobile terminal further comprises a third display screen and a fourth display screen, the third display screen is arranged on the first side surface of the housing, the fourth display screen is arranged on the second side surface of the housing, and the first side surface and the second side surface are opposite surfaces; and the method comprises:

acquiring screen status when a specified operation is received, the screen status being status of the first display screen and/or status of the second display screen;

selecting the display screen from the first display screen and the second display screen according to the second target display screen and the specified operation; and displaying a first current interface on the selected display screen, wherein the selecting the display screen from the first display screen and the second display screen according to the screen status and the specified operation comprises:

determining a second target display screen for currently displaying a second current interface when the screen status is a turned-on state, the second target display screen being the first display screen or the second display screen; and selecting the display screen from the first display screen and the second display screen according to the second target display screen and the specified operation; and wherein the selecting the display screen from the first display screen and the second display screen according to the second target display screen and the specified operation comprises:

determining a first target display screen on which the specified operation is triggered; and selecting a display screen associated with the first target display screen when the first target display screen is the third display screen or the fourth display screen and the display screen associated with the first target display screen is different from the second target display screen.

8. The method of claim 7, further comprising:

turning off the display screen of the mobile terminal when the first target display screen is the third display screen or the fourth display screen and the display screen associated with the first target display screen is the second target display screen.

9. A screen display method, wherein the method is applied to a mobile terminal, the mobile terminal comprises a first display screen and a second display screen, the first display screen is arranged on a first front surface of a housing of the mobile terminal, the second display screen is arranged on a second front surface of the housing, and the first front surface and the second front surface are opposite surfaces; the mobile terminal further comprises a third display screen and a fourth display screen, the third display screen is arranged on the first side surface of the housing, the fourth display screen is arranged on the second side surface of the housing, and the first side surface and the second side surface are opposite surfaces; and the method comprises:

displaying a first current interface on the selected display screen,
selecting a display screen from the first display screen and the second display screen according to the screen status and the specified operation; and
displaying a first current interface on the selected display screen,
wherein the selecting the display screen from the first display screen and the second display screen according to the screen status and the specified operation further comprises:
determining a second target display screen for currently displaying a second current interface when the screen status is a turned-on state, the second target display screen being the first display screen or the second display screen; and
selecting the display screen from the first display screen and the second display screen according to the second target display screen and the specified operation; and
wherein the selecting the display screen from the first display screen and the second display screen according to the second target display screen and the specified operation comprises one of:
selecting a display screen other than the second target display screen from the first display screen and the second display screen when the specified operation is a flip operation;
selecting the second display screen when the second target display screen is the first display screen and the first target display screen on which the specified operation is triggered is the second display screen; and
selecting the first display screen when the second target display screen is the second display screen and the first target display screen on which the specified operation is triggered is the first display screen, and
the method further comprises:
turning off the display screens of the mobile terminal when the first target display screen is the third display screen or the fourth display screen.

10. A mobile terminal, comprising: a first display screen and a second display screen, wherein the first display screen is arranged on a first front surface of a housing, the second display screen is arranged on a second front surface of the housing, and the first front surface and the second front surface are opposite surfaces; the mobile terminal further comprises a third display screen and a fourth display screen, the third display screen is arranged on the first side surface of the housing, the fourth display screen is arranged on the second side surface of the housing, and the first side surface and the second side surface are opposite surfaces; and the mobile terminal further comprises:

one or more processors, and
a volatile or non-volatile memory configured to store instructions executable by the one or more processors,
wherein the processor is configured to:
acquire a screen status when a specified operation is received, the screen status being status of the first display screen and/or status of the second display screen;
select a display screen from the first display screen and the second display screen according to the screen status and the specified operation; and
display a first current interface on the selected display screen,
the processor is further configured to determine a first target display screen on which the specified operation is triggered when the screen status is a turned-off state, and select the display screen from the first display screen and the second display screen according to the first target display screen; and
a selection module is further configured to select a display screen associated with the first target display screen when the first target display screen is the third display screen or the fourth display screen, select a specified display screen when the first target display screen is the third display screen or the fourth display screen, or select a display screen upper in a direction of gravity when the first target display screen is the third display screen or the fourth display screen.

11. The mobile terminal of claim 10, wherein the processor is further configured to select the first display screen when the first target display screen is the first display screen, or select the second display screen when the first target display screen is the second display screen.

12. The mobile terminal of claim 10, wherein the selection module is further configured to determine a second target display screen for currently displaying a second current interface when the screen status is a turned-on state, the second target display screen being the first display screen or the second display screen; and the the selection module is further configured to select the display screen from the first display screen and the second display screen according to the second target display screen and the specified operation.

13. The mobile terminal of claim 12, wherein the processor is further configured to select a display screen other than the second target display screen from the first display screen and the second display screen when the specified operation is a flip operation, select the second display screen when the second target display screen is the first display screen and the first target display screen on which the specified operation is triggered is the second display screen, or select the first display screen when the second target display screen is the second display screen and the first target display screen on which the specified operation is triggered is the first display screen.

14. The mobile terminal of claim 12,
the processor is further configured to determine a first target display screen on which the specified operation is triggered, and select a display screen associated with the first target display screen when the first target display screen is the third display screen or the fourth display screen and the display screen associated with the first target display screen is different from the second target display screen.

15. The mobile terminal of claim 10, wherein the processor is further configured to turn on the selected display screen when the screen status is a turned-off state, and display the first current interface on the selected display screen.

* * * * *